United States Patent
Acharya

(10) Patent No.: US 6,633,610 B2
(45) Date of Patent: Oct. 14, 2003

(54) VIDEO MOTION ESTIMATION

(75) Inventor: Tinku Acharya, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/406,032

(22) Filed: Sep. 27, 1999

(65) Prior Publication Data

US 2003/0031254 A1 Feb. 13, 2003

(51) Int. Cl.[7] ............................................. H04N 11/02
(52) U.S. Cl. ............................. 375/240.11; 375/240.21
(58) Field of Search ........................... 375/240, 240.19, 375/240.11, 240.16, 240.21; 348/403.1, 415.1; 382/233, 236, 240

(56) References Cited

U.S. PATENT DOCUMENTS

| | | | | |
|---|---|---|---|---|
| 5,398,067 A | * | 3/1995 | Sakamoto | .................. 348/403 |
| 5,734,431 A | * | 3/1998 | Drachiku et al. | ........... 348/415 |
| 5,974,186 A | * | 10/1999 | Smith et al. | ................. 382/240 |
| 5,995,668 A | * | 11/1999 | Corset al. | .................... 382/233 |
| 6,091,777 A | * | 7/2000 | Goetz et al. | ................. 375/240 |
| 6,154,557 A | * | 11/2000 | Boon | .......................... 382/236 |
| 6,208,692 B1 | * | 3/2001 | Song et al. | ............. 375/240.19 |
| 6,298,163 B1 | * | 10/2001 | Sodager et al. | .............. 382/240 |

* cited by examiner

*Primary Examiner*—Chris Kelley
*Assistant Examiner*—George A Bugg, Jr.
(74) *Attorney, Agent, or Firm*—Trop, Pruner & Hu, P.C.

(57) ABSTRACT

A system includes a processor and a memory. The memory stores a program to cause the processor to decompose a first frame of a video into a first set of frequency subbands. The first frame includes a first subimage. The program causes the processor to decompose a second frame of the video into a second set of frequency subbands and selectively compare portions of the first and second frequency subbands to locate a second subimage of the second frame. The second subimage is substantially identical to the first subimage.

16 Claims, 5 Drawing Sheets

VIDEO MOTION ESTIMATION

BACKGROUND

The invention generally relates to video motion estimation.

Data compression typically removes redundant information from a set of data to produce another set of data that has a smaller size. This smaller size may be beneficial, for example, for purposes of transmitting the data over a bus or network.

For example, data compression may be used to reduce the amount of data that indicates snapshot images, or frames, of a video. In this manner, successive frames of a particular scene of the video may exhibit temporally redundant information that changes very little between the frames. Most changes from one frame to the next in a particular scene typically may be attributable to the motion of objects in the scene. As an example, referring to FIG. 1, an object 3 of one frame 4 may be displaced by a few pixels in a particular direction and reappear in a different location in the next successive frame 5.

Thus, for purposes of compressing the total data that is used to indicate the frames 4 and 5, the redundant pixel data that indicates the object 3 may not appear twice. Instead, as an example, for the frame 5, the data may indicate a motion vector that represents the relative displacement of the object 3 between the frames 4 and 5. Similarly, data for the subsequent frames in which the object 3 appears may indicate motion vectors instead of the pixel intensity data for the object 3. The above-described technique typically is referred to as motion compensation, and one such technique is described in the Moving Picture Experts Group (MPEG) standard, such as the MPEG-2 standard, for example. The MPEG-2 standard is described in ISO/IEC 13818-1 (MPEG-2 Systems), ISO/IEC 13818-2 (MPEG-2 Video), and ISO/IEC 13818-3 (MPEG-2 Audio), dated in 1994 and provided by the International Organization For Standardization (ISO) and the International Electrotechnical Commission (IEC).

Motion estimation is used to generate the motion vectors and thus, is used to identify and track object movement between frames. One such motion estimation technique uses a block matching algorithm, an algorithm that includes spatially subdividing frames into rectangular grids of subimages 8 (as depicted by a portion 6 of a frame in FIG. 2). Each subimage 8 is a rectangular block of pixels, and the block matching algorithm tracks movement of the subimages 8 between frames. For example, a particular subimage 8a may move by a vector 9 (see FIG. 3 of a corresponding portion 7 of a successive frame) from the Cartesian coordinates $(x_1, y_1)$ in one frame to the Cartesian coordinates $(x_2, y_2)$ in the next frame.

To identify the subimages 8 that have moved between successive frames, each subimage 8 of a particular frame may be compared with a subimages 8 of a corresponding region of the next frame. In this manner, this corresponding region may include the subimage 8 of the next frame that has the same Cartesian coordinates and it neighboring subimages 8. Thus, each subimage 8 of a particular frame may be compared one at a time with selected subimages of the next frame to determine the maximum likelihood that the subimage 8 appears in the next frame, and if the subimage 8 does appear, relative displacement of the subimage 8 between frames is then computed. The maximum likelihood that the subimage appears in the next frame may be determined after each comparison using an image block matching criteria that is based on the computation of the standard deviation of the two subimages being compared.

Unfortunately, typical block matching algorithms use a large amount of memory and use a large amount of processing power. These characteristics may prevent their use with interactive video applications and low cost portable imaging devices.

Thus, there is a continuing need for a technique that address one or more of the problems that are stated above.

SUMMARY

In one embodiment of the invention, a method includes decomposing a first frame of a video into a first set of frequency subbands. The first frame includes a first subimage. A second frame of the video is decomposed into a second set of frequency subbands, and portions of the first and second sets of frequency subbands are selectively compared to locate a second subimage of the second frame. The second subimage is substantially identical to the first subimage.

Advantages and other features of the invention will become apparent from the following description, drawing and claims.

DETAILED DESCRIPTION

Figure 1:
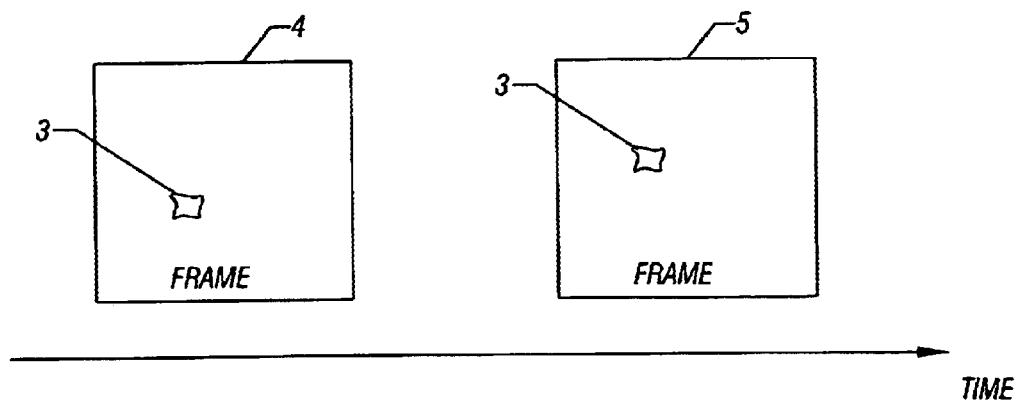
FIG. 1 illustrates successive frames of a video according to the prior art.
Figure 2:
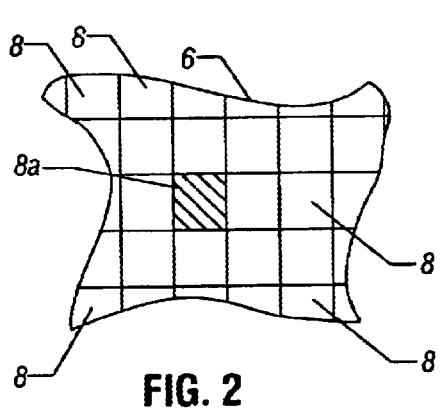
FIGS. 2 and 3 illustrate a frame-based technique to estimate motion in a video according to the prior art.
Figure 3:
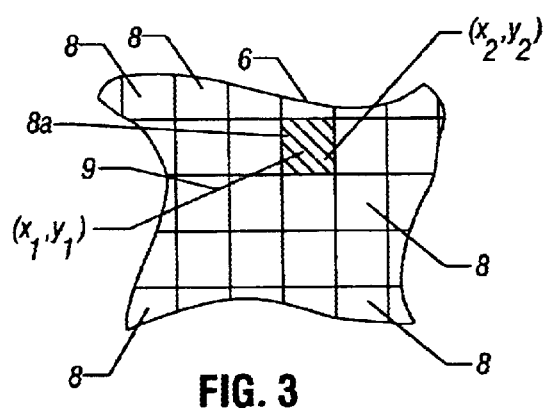
Figure 4:
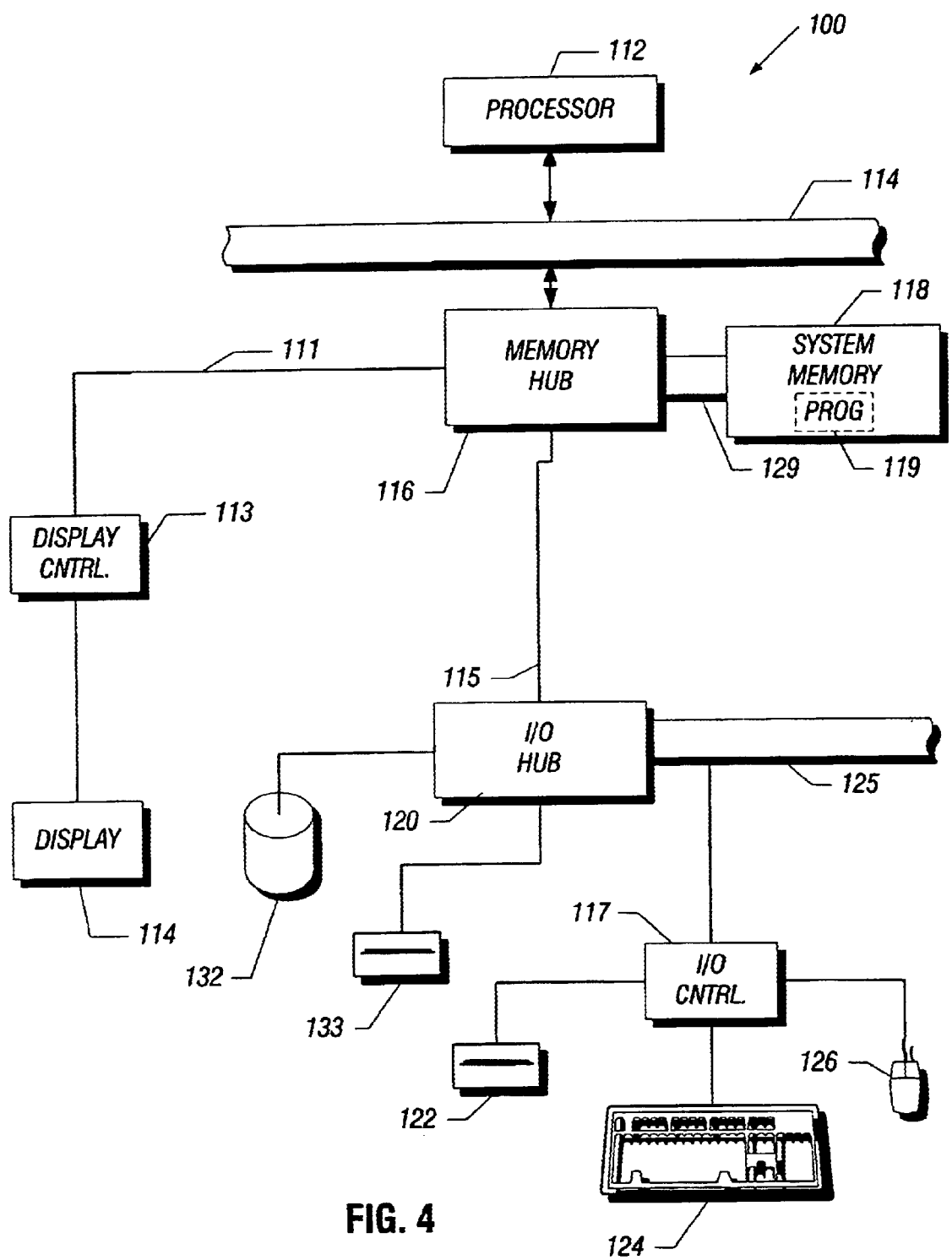
FIG. 4 is a schematic diagram of a computer system according to an embodiment of the invention.

Referring to FIG. 4, an embodiment 119 of a motion estimation program in accordance with the invention causes a processor 112 to apply wavelet transformations to the frames of a video and use the results of the transformation to estimate motion of objects between frames of the video, as described below. By using this technique, the amount of computations that are used to estimate motion may be reduced by as much as approximately 90%, as compared to conventional motion estimation techniques.

More particularly, in some embodiments, the motion estimation program 119 causes the processor 112 to decompose each frame of the video using wavelet transformations to produce spatially filtered images called frequency subbands. As described below, the processor 112 processes these subbands to estimate motion.

Figure 5:
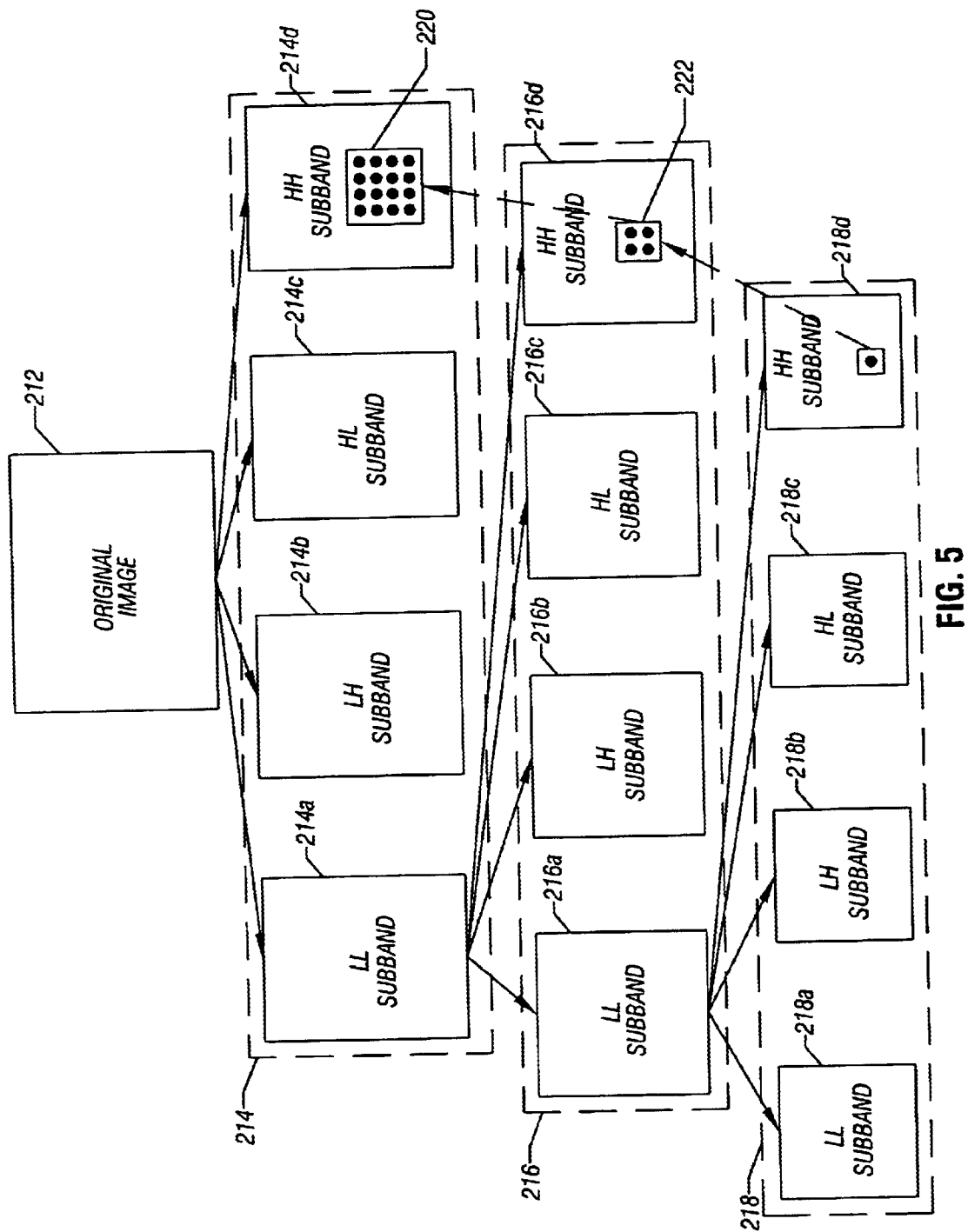
FIG. 5 is an illustration of the hierarchical order of subbands produced by wavelet transformations.

Referring to FIG. 5, as an example, wavelet transformations may be used to decompose a particular frame 212 into subbands that appear in different decomposition levels (levels 214, 216 and 218, as examples). In this manner, to decompose the frame 212 into subbands 214a, 214b, 214c and 214d of the first decomposition level 214, a one dimensional Discrete Wavelet Transform (DWT) is applied row-wise and then column-wise. Using a one-dimensional DWT, the signal (a row-wise signal, for example) is first low-pass filtered and sub-sampled by dropping the alternate filtered output to produce the low-frequency subband (L) that is half the size of the original signal. Then the same signal is high-pass filtered and similarly sub-sampled to produce the high-frequency subband (H) which is half the size of the original signal. When the same one dimensional operation is applied column-wise on the L subband, it produces two subbands LL and LH. Similarly, applying the same one dimensional operation column-wise on the H subband, it produces two subbands HL and HH subbands. As a result, after two-dimensional Discrete Wavelet Transforms, the original frame 212 is decomposed into four subbands: the LL subband 214a, the LH subband 214b, HL subband 214c and HH subband 214d. Sizes of the row and column of each of these subbands is half the sizes of the row and column of the original images due to the sub-sampling operation. The values of these subbands are called the wavelet coefficients, and hence, the subbands may be represented by an associated matrix of wavelet coefficients.

The LL subband 214a indicates low frequency information in both the horizontal and vertical directions of the frame 212 and typically represents a considerable amount of information present in the frame 212 because it is nothing but the sub-sampled version of the original frame 212. The LH subband 214b indicates low frequency information in the horizontal direction and high frequency information in the vertical direction, i.e., horizontal edge information. The HL subband 214c indicates high frequency information in the horizontal direction and low frequency information in the vertical direction, i.e., vertical edge information. The HH subband 214b indicates high frequency information in the horizontal direction and high frequency information in the vertical direction, i.e., diagonal edge information.

Because the LL subband 214a is the sub-sampled version of the original frame 212, the subband 214a maintains the spatial characteristics of the original image. As a result, the same DWT decomposition can be further applied to produce four subbands that have half the resolution of the LL subband 214a in both the vertical and horizontal directions: the LL subband 216a, LH subband 216b, HL subband 216c and HH subband 216d. Hence, the LL subband 216a is again the sub-sampled version of the LL subband 214a. The LL subband 216a may be further decomposed to four subbands that have half of its resolution in both horizontal and vertical directions: LL subband 218a, LH subband 218b, HL subband 218c and HH subband 218d.

The subbands of the lower decomposition levels indicate the information that is present in the original frame 212 in finer detail (i.e., the subbands indicate a higher resolution version of the frame 212) than the corresponding subbands of the higher decomposition levels. For example, the HH subband 218d (the parent of the HH subband 216d) indicates the information that is present in the original frame 212 in coarser detail than the HH subband 216d (the child of the HH subband 218d), and the HH subband image 214d (another descendant of the HH subband 18d) indicates the information that is present in the original frame 212 in finer detail than the HH 216d and 218d subbands. In this manner, a pixel location 224 of the HH subband image 218d corresponds to four pixel locations 222 of the HH subband 16d and sixteen pixel locations 220 of the HH subband 214d.

Therefore, to generalize, an m×m block in the LL3 subband that is centered at the Cartesian coordinates (x,y) has a direct relationship with an m×m block that is centered at the Cartesian coordinates (x,y) in each of the LH3, HL3 and HH3 subbands. For example, an m×m block in the LH3 subband has the vertical edge information of a corresponding m×m block in the LL3 subband. This m×m block in the LL3 subband, in turn, is an 8:1 sub-sampled version of the original frame 212.

Due to the above-described hierarchical nature of the multi-resolution subband decomposition, the same m×m block in the LL3 subband has an indirect relationship with 2m×2m blocks that are centered at the cartesian coordinates (2x, 2y) in each of the LH2, HL2 and HH2 subbands. In this manner, the 2m×2m blocks in the LH2, HL2 and HH2 subbands indicate edge information of a 4:1 sub-sampled version of the original frame 212. Similarly, this m×m block in the LL3 subband has an indirect relationship with 4m×4m blocks that are centered at (4x, 4y) in each of the LH1, HL1 and HH1 subbands. These 4m×4m blocks, in turn, indicate edge information of a 2:1 sub-sampled version of the original frame 212.iginal frame 12.

Figure 6:
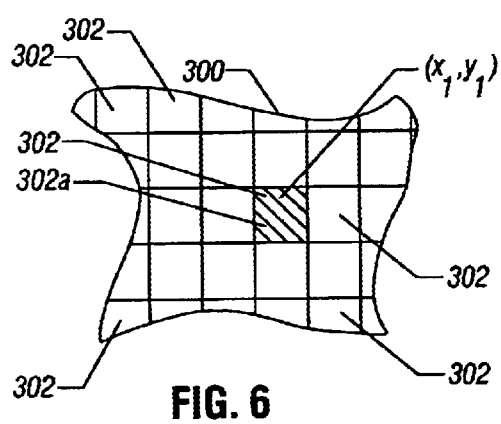
FIGS. 6 and 7 illustrate a wavelet subband technique to estimate motion in a video according to an embodiment of the invention.

Because the LL subband is a sub-sampled version of the original frame 12, in some embodiments, the motion estimation program 119 causes the processor 112 to estimate motion using the LL subbands of two consecutive frames. To accomplish this, in some embodiments, the program 119 causes the processor 112 to apply block matching techniques. For example, for a three level decomposition, the processor 112 decomposes a particular frame to produce an LL3 subband (a portion of this LL3 subband is depicted in FIG. 6) that is subdivided by the processor 112 into rectangular blocks of subimages 302. Each subimage 302, in turn, indicates a corresponding rectangular subimage of the frame.

Figure 7:
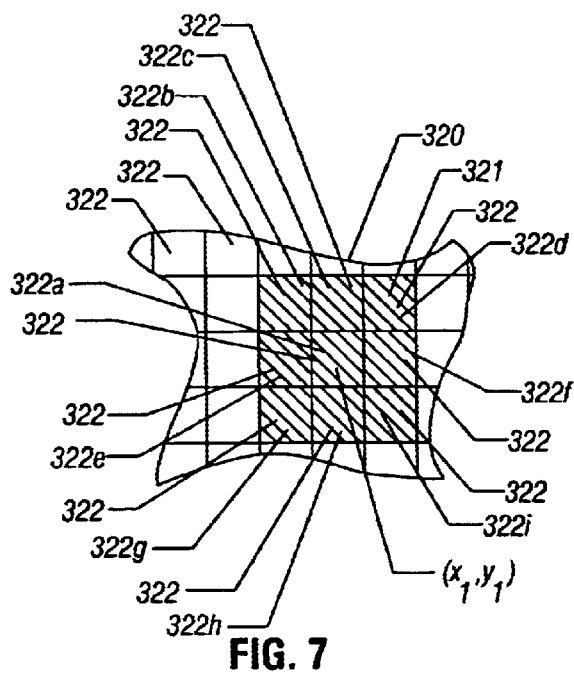

For each subimage 302, the program 119 causes the processor 112 to apply a block matching technique to estimate the motion of the subimage 302 by comparing the subimage 302 to selected subimages 322 of an LL3 subband (a portion 320 of this LL3 subband is depicted in FIG. 7) of the next successive frame. In some embodiments, the subimages 320 and 322 each have the same approximate size. For example, for a particular subimage 302a that is centered at cartesian coordinates (x,y), the processor 112 attempts to match the subimage 302, one at a time, with the subimages 322 of a corresponding region 321 of the LL3 subband of the next frame.

As an example, the region 321 may include a subimage 322a that is centered at cartesian coordinates (x,y) of the frame and subimages 322 322b, 322c, 322d, 322e, 322f, 322g, 322h and 322i that are neighbors to the subimage 322a. Thus, to evaluate the motion of the subimage 302a between frames, the processor 112 may compare the subimage 302a to each of the subimages 322 of the region 321 to find a match. A match occurs when the subimage 302 that is being compared is substantially identical to the subimage 322 to which it is being compared. In general, two subimages may be substantially identical when a predetermined image block matching criteria is satisfied. This matching criteria may be based on the computation of the standard deviation of the two subimages being compared.

If the comparison of a particular subimage 302 with the subimages 322 of the region 321 yields a unique match (i.e., if the processor 112 determines that the particular subimage 302 is substantially identical to just one of the subimages 322 of the region 321), then the processor 112 embeds data indicating the corresponding motion vector into the overall data for the next frame. The use of this motion vector, may result in a significant savings in compression performance, as the amount of data that represents the vector may be a fraction of the amount of data that represents the particular subimage 302.

However, the above-described block matching may not return a unique match, but instead, may be inconclusive or may return more than one match. When this occurs, the program 119 causes the processor 112 to match subimages in another subband of the third decomposition level, such as the LH3 subband, for example. In this manner, the processor 112 may attempt to match subimages of the LH3 subband of the current frame with subimages of the LH3 subband of the next frame in a manner similar to that described above for the LL3 subbands. For any inconclusive or multiple matches using the LH3 subbands, the processor 112 applies the block matching technique to the HL3 subbands.

The LH and HL subbands indicate high frequency edges and may also indicate spurious noise information, i.e., information that may prevent a match that would otherwise occur. For purposes of eliminating this spurious noise information, in some embodiments, the program 119 may cause the processor 112 to apply the following binary edge mapping technique to remove isolated points from the LH and HL subbands. In this manner, the processor 112 may map each wavelet coefficient of the LH, HL subband to either a "0" or a "1" based on the following criteria. If the processor 112 determines that the absolute value of a particular wavelet coefficient is much greater than all of its neighboring wavelet coefficients, then this particular wavelet coefficient is assumed to be associated with spurious noise, and the processor 112 maps that particular wavelet coefficient to "0." Otherwise, the processor 112 maps the wavelet coefficient to "1."

Thus, the above-described binary mapping produces an LH, HL subband of binary coefficients, and as a result of this mapping, the processor 112 may use a simplified binary block matching scheme to find a match for each block of the LH, HL subband. This finer adjustment of the matching in higher frequency subbands is an additional advantage over conventional block matching techniques and may result in higher quality reconstructed video images.

If the matching results are inconclusive or not unique for a particular subimage in the third decomposition level, then the program 119 causes the processor 112 to apply block matching in the next lowest decomposition level, the second decomposition level, using the LL, LH and HL priority described above. Similarly, if the results are inconclusive or not unique for a particular subimage in the second decomposition level, then the program 119 causes the processor 112 to apply block matching in the first decomposition level. As a last resort, a block matching technique may be applied to the original frame 112.

Thus, the processor 112 generally attempts to match subimage blocks beginning with the lowest resolution versions of the original frame 212 and refining the matching to the higher resolution versions if needed. Therefore, a much smaller percentage of block matching may be performed in the higher frequency subbands. Because the size of the LL3 subband is sixty-four times smaller than the original frame 12, mathematical analysis demonstrates that the above-described block matching technique may reduce computational requirements by approximately 90%.

Figure 8:
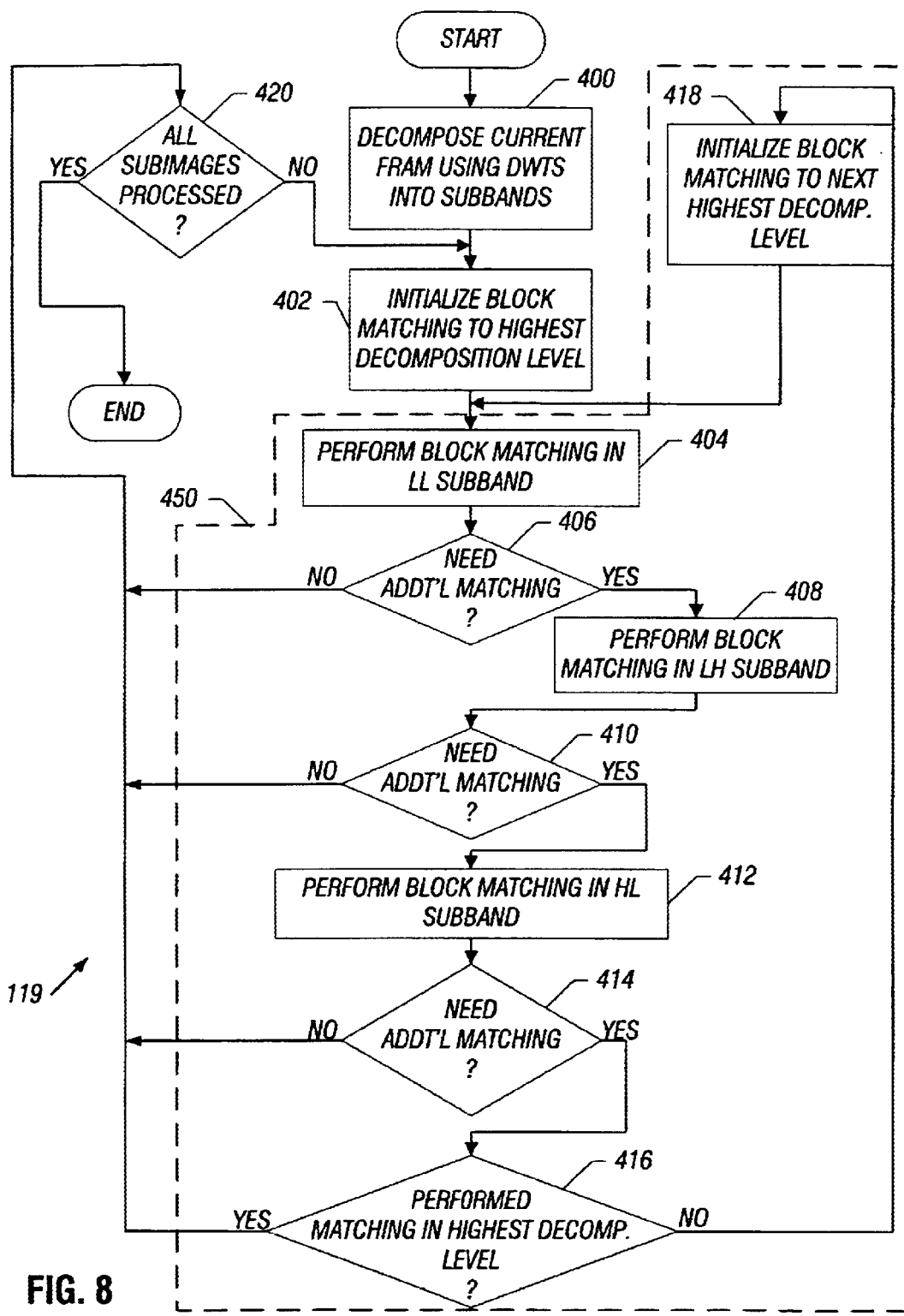
FIG. 8 is a flowchart illustrating the execution of a program to estimate motion according to an embodiment of the invention.

Referring to FIG. 8, to summarize, the program 119, when executed by the processor 112, may cause the processor 112 to perform the following block matching technique for the current frame. First, the processor 112 may decompose (block 400) the current frame into multiple decomposition levels of LH, HL and HH subbands using Discrete Wavelet Transform(s), as described above. The number of decomposition levels may be three, as described above, in some embodiments. However, in other embodiments, fewer or more decomposition levels may be used.

Next, the processor 112 initializes (block 402) the block matching to begin with the highest decomposition level and begins an execution loop 450 to find a match for the next subimage of the original frame 212. For example, for three levels of decomposition, the processor 112 uses each pass through the loop to find a match for an 8m×8m subimage block of the original frame, beginning with the corresponding m×m subimage block in the LL3 subband.

Thus, in the execution loop 450, the processor 112 initially performs (block 404) block matching in the LL subband of the highest decomposition level. If the processor 112 determines (diamond 406) that additional matching is needed (i.e., if the processor 112 determines that the matching results were inconclusive or not unique), then the processor 112 performs (block 408) block matching in the LH subband of the highest decomposition level. Otherwise, the processor 112 determines (diamond 420) whether all subimages have been processed, and if so, the program 119 is terminated. As described above, in some embodiments, before performing in the LH or HL subbands, the processor 112 may apply a binary mapping to the LH, HL subband. After the block matching in the LH subband, if the processor 112 determines (diamond 410) that additional mapping is needed, then the processor 112 performs (block 412) block matching in the HL subbands. Otherwise, the processor 112 returns to diamond 420. If the processor 112 subsequently determines (diamond 414) that additional matching is needed, then the processor 112 determines (diamond 416) if the processor 112 performed block matching in the lowest decomposition level in the latest pass through the execution loop 450. If additional matching is not needed, the processor 112 returns to diamond 420.

If additional block matching needs to be performed in the next highest decomposition level, then the processor 112 initializes (block 418) the block matching for that decomposition level and returns to block 404 to process the subband(s) of the lower decomposition until a unique match is found. If no match is found in this pass, then the processor 112 initializes the execution loop 450 to perform block matching in a lower decomposition level or levels until a match is found. If no matches are found for the subimage in the wavelet subbands, then the processor 112, in some embodiments, may perform block matching by spatially subdividing the current frame into subimage blocks and comparing these subimage blocks with the appropriate subimage blocks of the previous frame.

Referring back to FIG. 4, in some embodiments, the processor 112 may be part of a computer system 100. The computer system 100 may include a bridge, or memory hub 116, and the processor 112 and the memory hub 116 may be coupled to a host bus 114. The memory hub 116 may provide interfaces to couple the host bus 114, a memory bus 129 and an Accelerated Graphics Port (AGP) bus 111 together. The AGP is described in detail in the Accelerated Graphics Port Interface Specification, Revision 1.0, published on Jul. 31, 1996, by Intel Corporation of Santa Clara, Calif. A system memory 118 may be coupled to the memory bus 129 and store the compression program 119. As described above, the motion estimation program 119, when executed by the processor 112, may cause the processor 112 to decompose a first frame of a video into a first set of frequency subbands. The first frame includes a first subimage. The program 119 may cause the processor 112 to decompose a second frame of the video into a second set of frequency subbands and selectively compare portions of the first and second sets of frequency subbands locate a second subimage of the second frame. The second subimage is substantially identical to the first subimage.

Among other features of the computer system 100, a display controller 113 (that controls the display 114) may be coupled to the AGP bus 11. A hub communication link 115 may couple the memory hub 116 to another bridge circuit, or input/output (I/O) hub 120. In some embodiments, the I/O hub 120 includes interfaces to an I/O expansion bus 125 and a Peripheral Component Interconnect (PCI) bus 121. The PCI Specification is available from The PCI Special Interest Group, Portland, Oreg. 97214.

The I/O hub 120 may also include interfaces to a hard disk drive 132 and a CD-ROM drive 133, as examples. An I/O controller 117 may be coupled to the I/O expansion bus 125 and receive input data from a keyboard 124 and a mouse 126, as examples. The I/O controller 117 may also control operations of a floppy disk drive 122. Copies of the program 119 may be stored on, as examples, the hard disk drive 132, a diskette or a CD-ROM, as just a few examples.

In the context of this application, the phrase "computer system" may generally refer to a processor-based system and may include (but is not limited to) a graphics system, a desktop computer or a mobile computer (a laptop computer, for example), as just a few examples. The term "processor" may refer to, as examples, at least one microcontroller, X86 microprocessor, Advanced RISC Machine (ARM) microprocessor, or a Pentium® microprocessor. The examples given above are not intended to be limiting, but rather, other types of computer systems and other types of processors may be included in embodiments of the invention.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method comprising:
   decomposing a first frame of a video into at least a first subband that indicates a sub-sampled version of the first frame and a second subband that indicates at least one edge of the first frame, the first frame including a first subimage;
   decomposing a second frame of the video into at least a third subband that indicates a sub-sampled version of the second frame and a fourth subband that indicates at least one edge of the second frame, the second frame occurring in the video after the first frame;
   selectively comparing portions of the first and third subbands to locate a second subimage of the second frame, the second subimage being substantially identical to the first subimage; and
   based on the results of the comparisons of the portions of the first and third subbands, selectively comparing portions of the second and fourth subbands to locate the second subimage.

2. The method of claim 1, further comprising:
   determining a displacement between the first subimage and the second subimage.

3. The method of claim 1, wherein the first and third subbands comprise LL wavelet subbands.

4. The method of claim 1, wherein the second and fourth subbands comprise HL wavelet subbands.

5. The method of claim 1, wherein the second and fourth subbands comprise LH wavelet subbands.

6. An article comprising a storage medium readable by a processor-based system, the storage medium storing instructions to cause a processor to:
   decompose a first frame of a video into at least a first subband that indicates a sub-sampled version of the first frame and a second subband that indicates at least one edge of the first frame, the first frame including a first subimage;
   decompose a second frame of the video into at least a third subband that indicates a sub-sampled version of the second frame and a fourth subband that indicates at least one edge of the second frame, the second frame occurring in the video after the first frame;
   selectively compare portions of the first and third subbands to locate a second subimage of the second frame, the second subimage being substantially identical to the first subimage; and
   based on the results of the comparisons of the portions of the first and third subbands, selectively compare portions of the second and fourth subbands to locate the second subimage.

7. The article of claim 6, the storage medium storing instructions to cause the processor to selectively compare portions of the second and fourth subbands to locate the second subimage in response to the failure of the comparison of the first and third subbands to locate the second subimage.

8. The article of claim 6, the storage medium storing instructions to cause the processor to determine a displacement between the first subimage and the second subimage.

9. The article of claim 6, wherein the first and third subbands comprise LL wavelet subbands.

10. The article of claim 6, wherein the second and fourth subbands comprise HL wavelet subbands.

11. The article of claim 6, wherein the second and fourth subbands comprise LH wavelet subbands.

12. A system comprising:
    a processor; and
    a memory storing a program to cause the processor to:
       decompose a first frame of a video into at least a first subband that indicates a sub-sampled version of the first frame and a second subband that indicates at least one edge of the first frame, the first frame including a first subimage;
       decompose a second frame of the video into at least a third subband that indicates a sub-sampled version of the second frame and a fourth subband that indicates at least one edge of the second frame, the second frame occurring in the video after the first frame;
       selectively compare portions of the first and third subbands to locate a second subimage of the second frame, the second subimage being substantially identical to the first subimage; and
       based on the results of the comparisons of the portions of the first and third subbands, selectively compare portions of the second and fourth subbands to locate the second subimage.

13. The system of claim 12, wherein the processor performs at least one discrete wavelet transformation to decompose at least one of the first and second frames.

14. The system of claim 12, wherein the portions indicate at least one sub-sampled version of the first subimage.

15. The system of claim 12, wherein the portions indicate at least one edge of the first subimage.

16. The method of claim 1, further comprising:
    comparing portions of the second and fourth subbands to locate the second subimage in response to failure of the comparison of the first and third subbands to locate the second subimage.

* * * * *